(12) United States Patent
Heuft et al.

(10) Patent No.: US 7,232,026 B2
(45) Date of Patent: Jun. 19, 2007

(54) DEVICE FOR DIVIDING A DISORDERLY FLOW OF CYLINDRICAL OBJECTS, FOR EXAMPLE DRINKS BOTTLES, INTO SEVERAL PATHWAYS

(75) Inventors: Bernhard Heuft, Burgbrohl (DE); Gerd Kristandt, Worms (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 10/527,732

(22) PCT Filed: Sep. 11, 2003

(86) PCT No.: PCT/EP03/10112

§ 371 (c)(1),
(2), (4) Date: Aug. 26, 2005

(87) PCT Pub. No.: WO2004/026739

PCT Pub. Date: Apr. 1, 2004

(65) Prior Publication Data
US 2006/0131132 A1   Jun. 22, 2006

(30) Foreign Application Priority Data
Sep. 12, 2002   (DE) .......................... 202 14 153 U (51) Int. Cl.
*B65G 47/71* (2006.01)

(52) U.S. Cl. ...................... 198/445; 198/437; 198/442; 198/453; 198/454

(58) Field of Classification Search ................ 198/436, 198/437, 442, 445, 453, 454
See application file for complete search history.

(56) References Cited

U.S. PATENT DOCUMENTS

| 2,941,650 | A |   | 6/1960  | Clinton |
|-----------|---|---|---------|---------|
| 3,874,494 | A |   | 4/1975  | Temming |
| 3,999,648 | A | * | 12/1976 | Kennedy .................... 198/437 |
| 4,173,276 | A |   | 11/1979 | Raudat et al. |
| 4,544,059 | A | * | 10/1985 | Mernoe ....................... 198/453 |
| 4,880,104 | A | * | 11/1989 | Evans et al. ................. 198/445 |
| 4,966,272 | A |   | 10/1990 | Raudat |
| 5,235,996 | A |   | 8/1993  | Beswick |
| 5,515,668 | A | * | 5/1996  | Hunt et al. ................... 53/543 |
| 5,653,328 | A | * | 8/1997  | Pedrotto .................. 198/418.1 |

(Continued)

FOREIGN PATENT DOCUMENTS

DE   1 246 526 B   8/1967

(Continued)

*Primary Examiner*—Douglas Hess
(74) *Attorney, Agent, or Firm*—Drinker Biddle & Reath LLP (57) ABSTRACT

The apparatus serves to distribute a random stream of items into several lanes in which the items are transported individually one after the other. The apparatus has a transport device for the items, wherein the transport device has one or more driven conveyor belts and side rails as well as a lane divider. The lane divider has at least one movable divider which divides the stream of transported items. A middle divider can project against the direction of transport and side dividers can be set back staggered. In an embodiment, the lane divider has a frame to which the dividers are attached. The apparatus also has a device for driving the lane divider, so that the at least one divider carries out a back-and-forth movement in the direction of transport and/or transversely to it.

15 Claims, 4 Drawing Sheets

U.S. PATENT DOCUMENTS

| | | | |
|---|---|---|---|
| 5,768,860 A * | 6/1998 | Weaver | 53/543 |
| 5,944,165 A * | 8/1999 | Mannlein et al. | 198/442 |
| 6,895,730 B2 * | 5/2005 | Weaver et al. | 53/500 |
| 6,974,299 B2 * | 12/2005 | Prakken et al. | 414/791.6 |

FOREIGN PATENT DOCUMENTS

| | | |
|---|---|---|
| DE | 195 46 398 A1 | 6/1997 |
| EP | 1 038 808 A1 | 9/2000 |

\* cited by examiner

DEVICE FOR DIVIDING A DISORDERLY FLOW OF CYLINDRICAL OBJECTS, FOR EXAMPLE DRINKS BOTTLES, INTO SEVERAL PATHWAYS

CROSS-REFERENCE TO RELATED PATENT APPLICATIONS

This patent application claims priority from patent application PCT/EP03/10112 filed Sep. 11, 2003, which claims priority from German patent application DE 20214 153.5 filed Sep. 12, 2002, the entire content of which is herein incorporated by reference.

FIELD OF THE INVENTION

The invention relates to an apparatus for the distribution of a random stream of items, in particular drink bottles, into several lanes in which the items are transported individually one after the other.

BACKGROUND OF THE INVENTION

Distribution apparatuses are used in drink bottling plants between the filling device and the packaging station. The drink bottles coming from the filling device are first collected in a buffer. The buffer consists of an area formed from several conveyor belts lying parallel which represents a widened section of the transport device. The bottles are transported from this buffer to the distribution apparatus by banking-up pressure. The distribution of the bottles into individual lanes is necessary, as only in this way can the bottles from the packaging station be received and then fitted into boxes or other packaging with a specific number of bottles in each case.

The problem with distribution apparatuses is that the bottles can become wedged or form bridges and then are no longer taken along by the transport device.

A distribution apparatus is known from U.S. Pat. No. 4,173,276 in which the dividers are fixed at their downstream end and attached at their upstream end to a bracket which spans the transport device and is movable back and forth.

A distribution apparatus is known from EP 1 038 808 in which the random stream of bottles is distributed into four lanes. Three dividers are arranged between the two side rails, the middle one projecting somewhat further forward. The front ends of the dividers are developed as a swivellable flap, moved by a motor. Sensors serve to detect a blockage of the items and when a blockage occurs the flaps are swivelled by the motor.

A similar distribution apparatus is known from DE-C2-39 26 735, the bottles being distributed into eight parallel lanes lying alongside each other. The front ends of the dividers are arranged staggered and the middle divider projects furthest forward. In order to facilitate the entry of the bottles into the lanes the dividers can move transversely to the transport device.

Plastic (PET) bottles, because of their elasticity and the greater friction coefficient of plastic, have a particularly marked tendency to become wedged against one another and thus cause a blockage.

There is a need for an apparatus for the distribution of a random stream of items into individual lanes which largely prevents such blockages, particularly with regard to plastic bottles.

SUMMARY OF THE INVENTION

The invention provides an apparatus for the distribution of a random stream of items into several lanes which are adapted to transport the items individually one after the other. The apparatus has a transport device for the items, the transport device having one or more driven conveyor belts and side rails. The transport device transports the stream of items in a direction of transport. The apparatus also includes a lane divider to which several movable dividers are fixed, wherein the movable dividers are adapted to divide the stream of transported items. A device for driving the lane divider such that the movable dividers carry out a back and forth movement simultaneously in the direction of transport and transversely to it is also included.

DETAILED DESCRIPTION OF THE INVENTION

As shown in FIGS. 1–4, the invention is directed to an apparatus for the distribution of a random stream of items into several lanes which are adapted to transport the items individually one after the other.

In an embodiment, the apparatus comprises: a transport device 20 which has at least one driven conveyor belt 22 and side rails including a pair of side rails displaced from one another and bordering the conveyor belt 22, the transport device 20 transporting a stream of items in a direction of transport; a lane divider 30 having at least one movable divider 34 adapted to divide the stream of transported items; and a device for driving the lane divider 30 such that the movable dividers 34 moves back and forth simultaneously in the direction of transport and transversely to it.

In an embodiment, the at least one movable divider 34 is one of several movable dividers which includes a middle divider projecting against the direction of transport and side dividers set back staggered with respect to the middle divider.

In an embodiment, the distance between the side rails is increased incrementally in the direction of transport, the increase commences at a point in front of a front edge of a frontmost divider, wherein the distance from the edge to the point corresponds approximately to a dimension of an item.

In an embodiment, the incremental increases, i.e., steps 38, are rounded in a grooved manner.

In an embodiment, at least one of the side rails is divided and a part of the rail is adapted to be moved outwards.

In an embodiment, the front edge of the frontmost divider is formed in the shape of a tip.

In an embodiment, the dimension is a diameter d of a cylindrical item such as a drink bottle 10.

In an embodiment, the lane divider 30 includes a frame 32, and at least one movable divider 34 is fixed to the frame 32.

The apparatus for the distribution of a random stream of cylindrical objects, for example, drink bottles 10, across several lanes 11 to 16 has a transport device 20, a lane divider 30 and a drive 40 for the lane divider 30.

The transport device 20 is made up of several conveyor belts 22, which can be, for example, chain-link conveyors, and are arranged with as small as possible a distance between one another and are at approximately the same height, so that they form a practically continuous transport surface on which the drink bottles 10 stand. Together, the conveyor belts 22 make a transport surface on which several drink bottles 10 can stand side by side in the shown embodiment. In an embodiment, six drink bottles 10 stand side by side.

Figure 1:
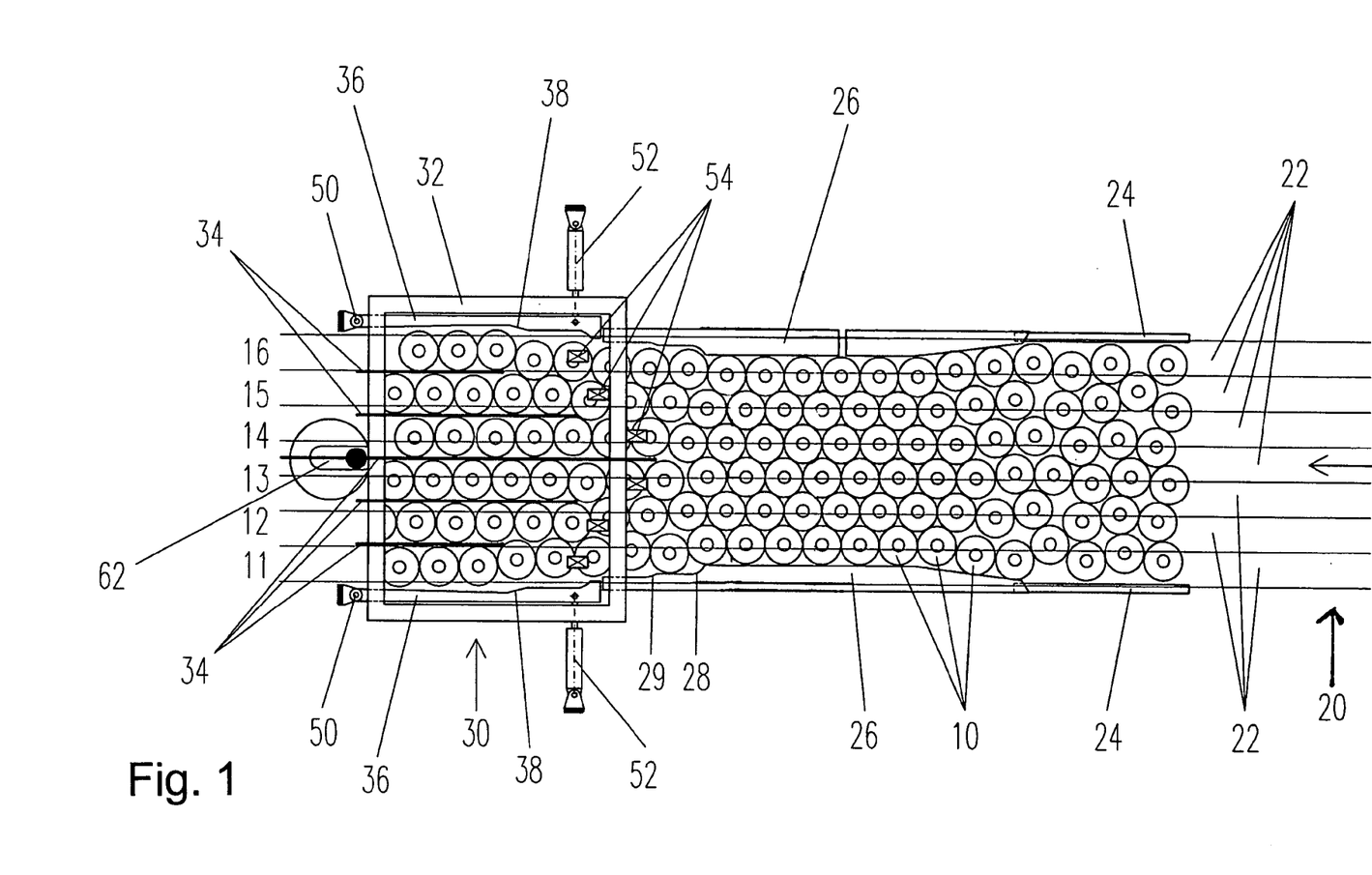
FIG. 1 is a top view of an embodiment of an apparatus according to the invention.

The direction of transport is shown in FIG. 1 by an arrow. The speed of transport is in general set such that the items to be distributed accumulate in front of the lane divider 30. This is achieved by having the conveyor belts 22 of the transport device 20 advance the drink bottles 10 or other items from the previous station more quickly than the items can be received. For example, the conveyor belts 22 may advance drink bottles 10 from a filling station (not shown) toward a follow-on packaging station more quickly than the drink bottles 10 are processed in the follow-on packaging station. The items are thereby under banking-up pressure. As a consequence of the banking-up pressure the circular items correspondingly arrange themselves to correspond to a two-dimensional hexagonal spherical pack.

The transport device 20 uses rails to guide the movement of the bottles 10. The overall railing arrangement is preferably two side rails, each of which is divided into, for example, three sections on each side of the transport device 20. The first section of the side rails 24 extend from the previous station, for example a filling station (not shown), to a location in front of the lane divider, wherein the location is at a distance somewhat greater than the width of the transport device 20. For example, the location may be at a distance approximately 0.5 to 1 meter in front of the lane divider 30. The first section of rails 24 have a substantially uniform distance apart from the previous station to this point in front of the lane divider 30. The first section of rails 24 are extremely stable, as the bottles 10 are conveyed under banking-up pressure.

The second section of rail 26, also called the formatting rail, joins the first section of rail 24 at its end which may be located, for example, approximately 0.5 to 1 meter in front of the lane divider 30. The second section of rails 26 extend approximately up to the lane divider 30.

The free distance between the rails narrows in the area of the formatting rail in order to force the cylindrical items into an ordered, hexagonal arrangement. The second section of rails 26 are profiled such that the distance between them decreases in the middle so that, when observed from above, the transport track is waisted.

In order for the items to distribute themselves into the individual lanes 11–16, to reduce the banking-up pressure, and to meet the greater space requirement which the cylindrical items have when they run into the lane divider 30, the lateral distance between the second section of rails 26 increases somewhat in front of the dividers 34. In an embodiment, this increase begins at a point which lies in front of the tip, i.e., the front edge, of the lane divider 30 at a distance which corresponds approximately to the diameter of the items. In another embodiment, this increase begins at a point which lies in front of the tip of the divider 34 which projects furthest against the direction of transport. This point lies at a distance which corresponds approximately to the diameter of the items. This increase in distance between the rails is preferably stepwise, i.e., incrementally. This has proved to be an effective means of avoiding blockages of the items in front of the lane divider 30.

Thus, in an embodiment, the inner sides of the second section of rails 26 have steps 28, 29 at the end facing the lane divider 30. The first step 28 has a height of approximately 30% of the diameter of the bottles 10, while the second step has a height of only approximately 10%. A third section of rails 36, which extend approximately to the downstream-side end of the lane divider 30, and have further steps in their front area, are adjacement to the second section of rails 26.

The third section of rail 36 connecting to the second section of rail 26 is capable of widening incrementally if necessary, because of the increased lateral space requirement of the items still running into the lane divider 30. The third section of rail 36 is preferably designed to rotate about a pivot placed at its rear end, so that it can be opened at the front to clear blockages. In an embodiment, the third section of rails 36 are rotatable about a first fulcrum 50 at their rear end by means of pneumatic cylinders 52, so that they open together at their front end by approximately 10 millimeters. The second section of rail may also be movable, for example, by a similar cam gearing to the lane divider 30, so that movement in the same direction is possible. The amplitude is, for example, 10 to 15 mm, and the frequency is approximately 0.5 to 4 Hz.

Figure 3:
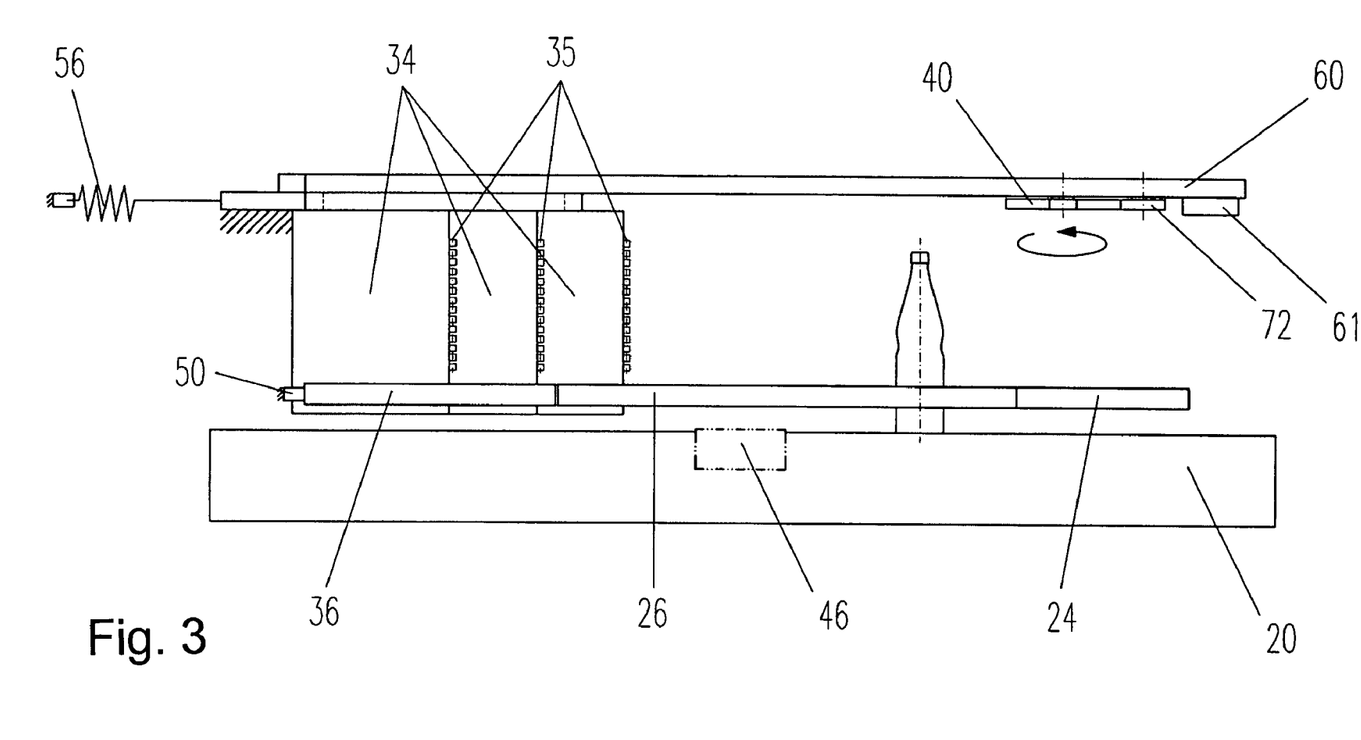
FIG. 3 is a side view of the apparatus of FIG. 1.

The lane divider 30 has a frame 32, arranged above the transport track, from which dividers 34 are suspended. The dividers can be, for example, plates or rails composed of individual rods which are suspended downwards from a common frame 32. The frame 32 is arranged at a sufficient distance over the transport track, so that the bottles 10 can be transported through beneath it, and the dividers 34 extend to just above the transport surface (FIG. 3). In general the dividers 34 run parallel to the direction of transport. They can, however, also run at an angle. The dividers 34 divide the space between the two side rails into individual lanes 11–16, the width of which is slightly greater than the diameter d of the items, so that the items in the lanes 11–16 are transported individually one after the other. The dividers 34 are moved back and forth in the direction of transport and transversely to it at the same time.

As shown in FIG. 3, in an embodiment, five dividers 34 are provided. These, together with the third section of rails 36, form the six lanes 11 to 16. The middle divider preferably projects furthest against the direction of transport, and the front ends of the dividers 34 arranged laterally thereof are offset staggered to the rear. The two adjoining dividers 34 are set back by approximately 1.5 to 2 bottle diameters and the two outermost dividers 34 are for their part set back by 1½ to 2 bottle diameters. If the front ends of the dividers 34 are joined, a V results.

A plurality of small rollers 35 with a vertical axis is arranged along the upstream-side edges of the dividers 34 (FIG. 3). In an embodiment, the rollers 35 which extend along the upstream-side edges of the dividers 34 have a diameter of a few millimeters.

The increase in the distance between the side rails is developed stepwise corresponding to the stagger of the dividers 34. Through the steps 28, 29 and 38, the transport track widens in the area in which the front ends of the dividers 34 lie. This widening is necessary, as the bottles 10 are arranged in the waisted area between the second section of rails 26 corresponding to a two-dimensional hexagonal close packing so that six rows of bottles with the diameter d occupy a transport track with a width equal to $d+d\times5\times\cos 30°\approx5.33\times d$. Distributed into lanes, six rows of bottles 10 occupy a transport track width of $6\times d+$the width of the dividers 34, however.

The first step 28 is at a distance which corresponds approximately to the diameter of the bottles, in front of the point of the furthest forward-projecting middle divider 34, and the last step 38 is approximately a half bottle diameter in front of the furthest set-back, outermost dividers 34.

In an embodiment, the distances between the side rails is not widened at two right angles, but in the manner of a groove in an eighth- to a quarter-arc of a circle. The side rail thus bends outwards at an angle of 10 to 30% at first and then runs on a section of an arc of a circle until it again runs parallel to the direction of transport. As can be seen in FIG. 1, in an embodiment, the steps 28, 29 and 38 are not rectangular, but the inner side of the second section and third section of rails 26 widens at first at an angle of approximately 30 to 45° in a grooved arc whose radius of curvature approximately corresponds to that of the surface of the bottles.

The height of the steps 28, 29, 38 results in each case from the additional space required by the items when they pass out of the hexagonal close packing into the individual lanes 11–16, the thickness of the dividers 34 also having to be taken into account. The step height therefore corresponds to approximately 10 to 30% of the diameter of the items.

The frame 32 on which the dividers 34 are mounted is expediently housed swivellable about a fulcrum at the rear, downstream end. An arm extends from the frame 32 against the direction of transport and the front, upstream-side end of the arm is moved in the direction of transport and transversely to it by means of a cam gearing 40. The housing of the downstream-side end of the frame 32 is developed such that a displacement of the frame 32 in the direction of transport by a short distance, for example, 15 mm, is possible.

The bottles 10 passing through each lane are counted by means of sensors 54. If there are differences within the individual lanes 11 to 16 or if no bottles are counted, this shows that a blockage has occurred in front of the lane divider 30. A control signal is then generated which carries out a short opening and closing movement of the third section of rails 36 by means of the pneumatic cylinders 52.

Figure 2:
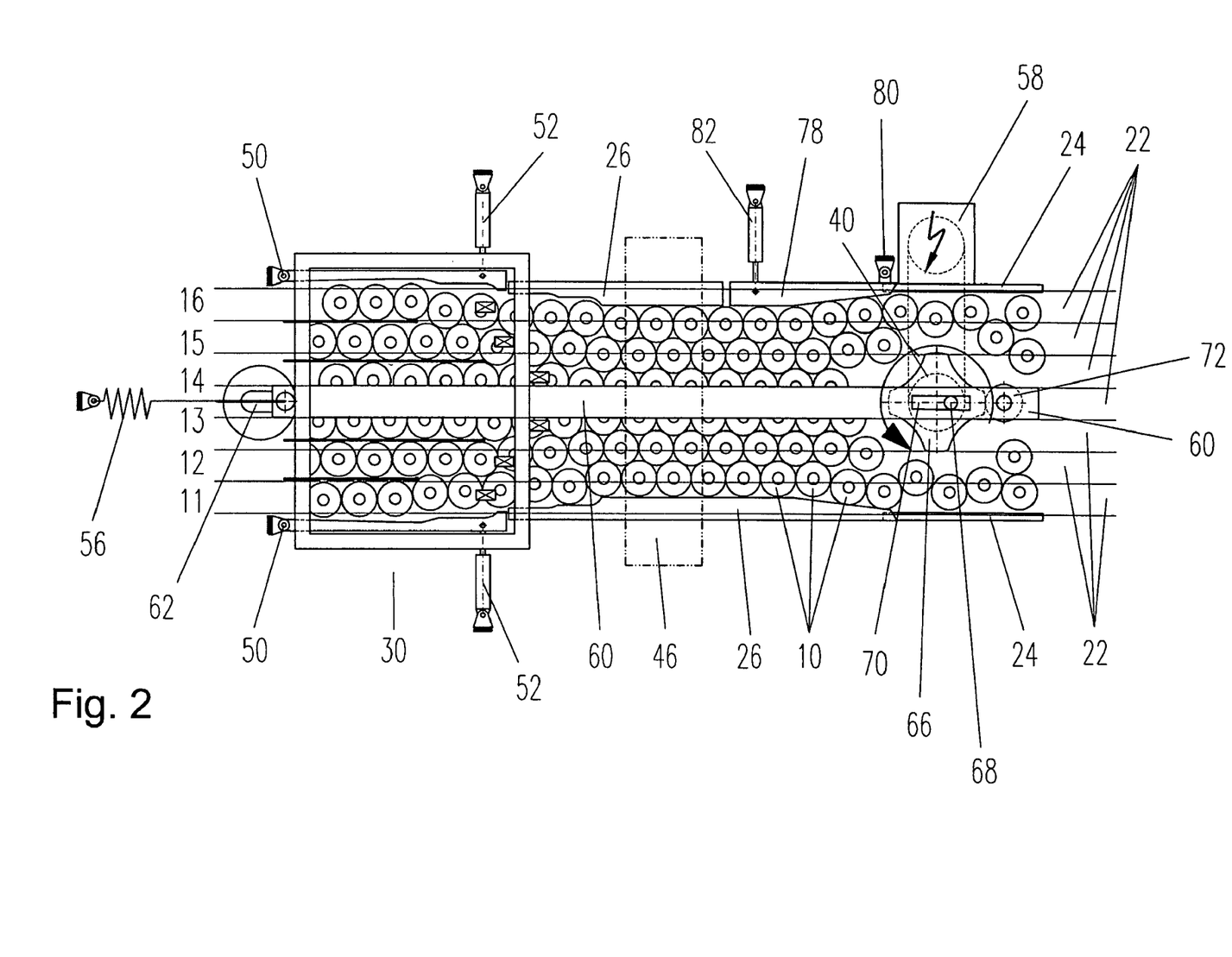
FIG. 2 is another top view of an embodiment of an apparatus according to the invention.

In an embodiment, as shown in FIG. 2, one of the two second section of rails 26 is divided and the upstream-side part 78 can be rotated by means of a cylinder 82 about a second fulcrum 80 placed on the upstream side. A distance between the two second section of rails 26 can thereby be changed and the formatting of the cylindrical items 10 corrected if necessary.

In the embodiment of FIG. 2, a pushover plate 46 is provided approximately half-way along the second section of rails 26. This pushover plate 46 lies directly on the conveyor belts 22, so that the drink bottles 10 are pushed over the gliding plate 46 under the pressure exerted by the following drink bottles 10. The friction force of the drink bottles 10 standing on the pushover plate 46 acts against the pressure exerted by the following bottles 10, so that the banking-up pressure is reduced after the pushover plate 46.

The frame 32 is carried by a beam 60. On the upstream side the beam 60 projects by around half a meter from the frame 32 and, at this end, slides on a support 61 which is fixed to the apparatus, as shown in FIG. 3. On the downstream side the beam 60 ends approximately with the frame 32 and the dividers 34 and here it is housed rotatable in an oblong hole 62 of a holder by means of a pin. In addition to being rotatable, the beam 60 is able to be displaced by a few centimeters in the direction of transport. The beam 60 is loaded by a spring 56 with the lane divider 30 fixed thereto in the direction of transport.

At the upstream-side end of the beam 60 there is a cam gearing 40 serving as a drive which moves this end of the beam 60 back and forth in the direction of transport and transversely to it. In an embodiment, the cam gearing 40 has, as cam disk, a star wheel 66. In an embodiment, the star wheel 66 has three or four teeth, the tips of the teeth being connected to a curved line as in a Maltese cross. Thus, the star wheel 66 may be formed by four concave cut-out sections, distributed uniformly on the periphery of a circular disk.

The star wheel 66 is rotatably housed and has an eccentric bolt 68 at distance of approximately ⅓ to ¼ of its radius. The bolt 68 engages in a slit 70 of the beam 60. In an embodiment, the slit 70 is elongated. On its upstream-side end the beam 60 also carries a roller 72. The roller 72 rests against the cam disk and may be pre-stressed against the cam, for example, by means of a spring. For example, in an embodiment, the roller 72 is elastically pressed against the periphery of the star wheel 66 under the force of the spring 56.

The star wheel 66 is driven by a motor, such as an electric motor 58. The rotation of the star wheel 66, through the eccentric bolt 68, brings about a pendulum movement of the beam 60 transversely to the direction of transport. In addition, the rotation of the star wheel 66 also causes a forward and backward movement of the beam 60 and the dividers 34 in the direction of transport. This is because the roller 72 follows the periphery of the star wheel 66 under the force of the spring 56.

The amplitude of both movements is a few centimeters. This amplitude is reduced according to the ratio of the length of the beam 60 and the length of the dividers 34, so that the front ends of the dividers 34, however, carry out a corresponding movement with an amplitude of only approximately 8 mm. As can be seen in FIG. 3, the star wheel 66 is arranged under the beam 60 and thereby supports this end of the beam 60.

Figure 4:
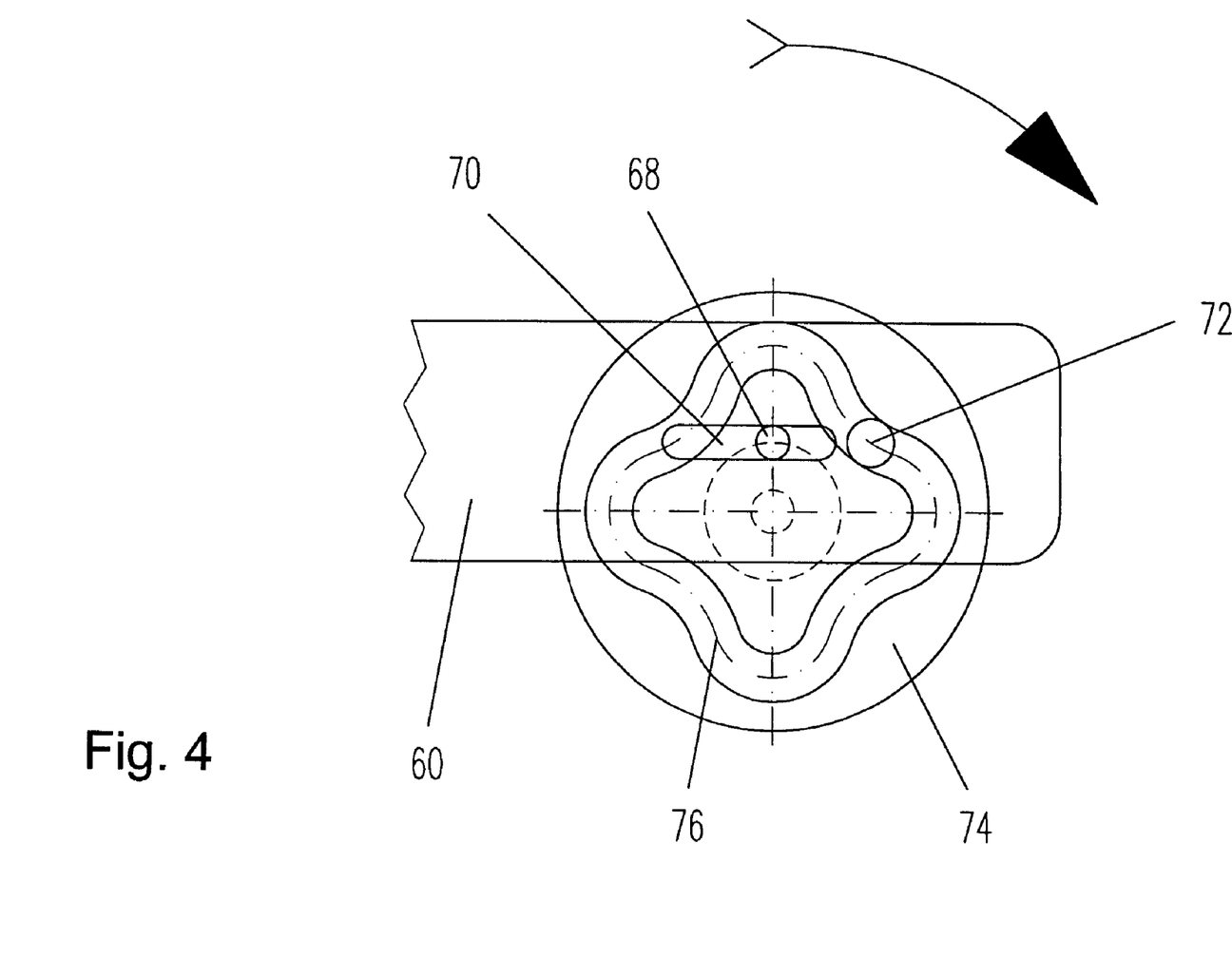
FIG. 4 is a top view of a cam disk with a grooved track.

In the embodiment of FIG. 4, the star wheel 66 is replaced by a disk 74 with a grooved track 76, the grooved track 76 running approximately according to the periphery of the star wheel 66, so that the end of the beam 60 carries out the same swivelling and translation movement and therefore the lane divider 30 and the front end of the dividers 34 also carry out the same superimposed orbital and linear movements. In the embodiment shown in FIG. 4, the spring 56 is dispensed with, as the roller 72 is guided in constricted manner in the grooved track 76.

Because the roller 72 lies against the periphery of the star wheel 66 and the cam disk 74 has a grooved track 76, the beam 60, and thus the dividers 34 also, are moved back and forth in the direction of transport at the same time, as often as corresponds to the number of teeth of the star wheel 66. Thus, if the cam or star wheel 66 has four teeth, the back-and-forth movement transversely to the direction of transport is overlaid by four back-and-forth movements of the dividers in the direction of transport. The star wheel 66 can also have three or another number of concave recesses and the end of the beam 60 has in each case a corresponding number of forward and backward movements in the direction of transport for each back-and-forth movement transversely to the direction of transport. The star wheel 66 and the disk 74 respectively revolve at a speed of approximately 0.5 to 4 revolutions/second.

In an embodiment, the occurrence of a blockage is established by recording the movement of the items by means of a CCD camera or light barriers or by comparing the speed of transport within the individual lanes.

In general the vibration or rotary movement of the lane dividers 30 is enough to effectively prevent a reciprocal wedging or a bridge formation of the bottles 10. In principle, the items are preferably fed to the lane divider 30 at as low as possible a banking-up pressure. Thus the banking-up pressure in front of the lane divider 30 is to be as low as possible. In an embodiment, as shown in FIG. 2, this can be achieved by placing a stationary pushover plate 46 onto the transport device 20 at a location which is a short distance in front of the lane divider 30. This causes the conveyor belts 22 to move through under the pushover plate 46, and the items are pushed by the banking-up pressure over the pushover plate 46. The resulting friction acts against the banking-up pressure, thereby reducing it. In another embodiment, the banking-up pressure in front of the lane divider 30 can also be reduced by transferring the bottles 10 onto a slower-running transport device in front of the lane divider 30. In still another embodiment, the movement of the items can be slowed by making the rail somewhat narrower.

The steps 28, 29 and 38 are an additional means of preventing wedging and bridge formation in exceptional cases. Each time a bottle 10 slides along a step 28, 29, 38, this causes the neighboring bottles 10 to vibrate, whereby any wedgings are cleared. The grooved form of the steps has proved of particular value here, as the bottles 10, after crossing the step, encounter the entire circular arc of the groove here, whereby the impact is distributed over a larger surface and the bottle 10 involved is itself less deformed, but gives the neighboring bottles a relatively strong jolt.

The side rails are arranged displaceable transversely to the direction of transport, so that their distance can be increased. Thus, if, in spite of the above two measures, wedgings or bridge formations still occur, a wedging can finally be cleared or a formed bridge destroyed by briefly moving the side rails apart. For example, the front ends of the third section of rails 36 may be briefly opened and closed again to clear a wedging of bottles 10 or destroy a formed bridge.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for distributing a random stream of items into several lanes which are adapted to transport the items individually one after the other, the apparatus comprising:
   a transport device which has at least one driven conveyor belt, and a pair of side rails, displaced from one another and bordering the conveyor belt, the transport device transporting the stream of items in a direction of transport;
   a lane divider assembly including at least two movable lane dividers adapted to divide the stream of transported items; and
   a device for driving the lane divider assembly such that the at least two movable lane dividers move back and forth simultaneously in and against the direction of transport and transversely to it, such that when moving back and forth in and against the direction of transport, the two movable lane dividers maintain a position substantially parallel with respect to each other and substantially aligned with respect to the direction of transport.

2. The apparatus according to claim 1, wherein the at least two movable dividers are two of several movable dividers which include a middle divider projecting against the direction of transport and side dividers set back staggered with respect to the middle divider.

3. The apparatus of claim 1, wherein a part of at least one of the side rails is adapted to move outwards.

4. The apparatus of claim 3, further comprising:
   a sensor for detecting blockages, wherein upon detecting a blockage, the sensor sends a control signal to carry out an opening and closing movement of the movable part of at least one of the side rails.

5. An apparatus for distributing a random stream of items into several lanes which are adapted to transport the items individually one after the other, the apparatus comprising:
   a transport device which has at least one driven conveyor belt, and a pair of side rails, displaced from one another and bordering the conveyor belt, the transport device transporting the stream of items in a direction of transport;
   a lane divider including at least one movable divider adapted to divide the stream of transported items; and
   a device for driving the lane divider such that the at least one movable divider moves back and forth simultaneously in the direction of transport and transversely to it,
   wherein the distance between the side rails increases incrementally in the direction of transport, the increase commencing at a point in front of a front edge of a frontmost divider, and
   wherein a distance from the front edge to the point corresponds approximately to a dimension of one of the items.

6. The apparatus of claim 5, wherein the incremental increases are rounded in a grooved manner.

7. The apparatus of claim 5, wherein the front edge is formed in the shape of a tip.

8. The apparatus of claim 5, wherein the dimension is a diameter of a cylindrical item.

9. An apparatus for distributing a random stream of items into several lanes, the apparatus comprising:
   a conveyor belt transporting the stream of items in a downstream direction;
   a pair of side rails displaced from one another, each side rail bordering a side of the conveyor belt parallel to the direction of transport;
   a beam above the conveyor belt in a position parallel to the conveyor belt, the beam rotating about a fulcrum and being displaced in and against the direction of transport;
   a lane divider assembly suspended from the beam, the lane divider assembly including a frame and at least one lane divider fixed to the frame; and
   a driver driving the beam transversely across the direction of transport and in and against the direction of transport such that when the beam moves in and against the direction of transport, the frame moves longitudinally with respect to the conveyor belt.

10. The apparatus of claim 9, wherein the at least one lane divider is one of several lane dividers which includes a middle divider projecting against the direction of transport and side dividers set back staggered with respect to the middle divider.

11. The apparatus of claim 9, wherein a part of at least one side rail is adapted to move outwards.

12. The apparatus of claim 9, wherein the driver is a cam gear which includes a cam disk selected from the group consisting of a star wheel and a disk with a grooved track, wherein the cam disk is driven by a motor.

13. A method for dividing a random stream of items into several lanes, the method comprising:

transporting the items in a downstream direction toward at least one lane divider via at least one conveyor belt;

guiding the items on the conveyor belt using a pair of side rails, one side rail on each side of the conveyor belt, the side rails being parallel to the direction of transport;

ordering the items into a hexagonal arrangement by narrowing the distance between the side rails;

incrementally increasing the distance between the side rails as the items approach the at least one lane divider; and transporting the items past the at least one lane divider thereby dividing the items into at least two lanes.

14. The method of claim 13, further comprising:

moving the lane divider in an upstream, downstream and transverse direction across the stream of items.

15. The method of claim 13, further comprising: moving a part of at least one side rail outward and inward.

* * * * *